United States Patent [19]

Sircar

[11] Patent Number: 5,084,075
[45] Date of Patent: Jan. 28, 1992

[54] VACUUM SWING ADSORPTION PROCESS FOR PRODUCTION OF 95+% N₂ FROM AMBIENT AIR

[75] Inventor: Shivaji Sircar, Wescosville, Pa.

[73] Assignee: Air Products and Chemicals, Inc., Allentown, Pa.

[21] Appl. No.: 507,700

[22] Filed: Apr. 10, 1990

[51] Int. Cl.⁵ ............................................. B01D 53/04
[52] U.S. Cl. ........................................... 55/25; 55/31; 55/33; 55/58; 55/68; 55/75
[58] Field of Search ................. 55/25, 26, 31, 33, 35, 55/58, 62, 68, 74, 75

[56] References Cited

U.S. PATENT DOCUMENTS

| | | | |
|---|---|---|---|
| 3,176,444 | 4/1965 | Kiyonaga | 55/26 |
| 3,280,536 | 10/1966 | Berlin | 55/58 |
| 3,313,091 | 4/1967 | Berlin | 55/58 |
| 3,923,477 | 12/1975 | Armond et al. | 55/25 |
| 4,013,429 | 3/1977 | Sircar et al. | 55/33 |
| 4,065,272 | 12/1977 | Armond | 55/58 X |
| 4,077,779 | 3/1978 | Sircar et al. | 55/25 |
| 4,144,037 | 3/1979 | Armond et al. | 55/58 |
| 4,168,149 | 9/1979 | Armond et al. | 55/58 X |
| 4,264,340 | 4/1981 | Sircar et al. | 55/25 |
| 4,477,265 | 10/1984 | Kumar et al. | 55/26 |
| 4,539,019 | 9/1985 | Koch | 55/33 X |
| 4,599,094 | 7/1986 | Werner et al. | 55/26 |
| 4,640,694 | 2/1987 | Leitgeb et al. | 55/26 |
| 4,711,645 | 12/1987 | Kumar | 55/33 X |
| 4,756,723 | 7/1988 | Sircar | 55/25 |
| 4,770,676 | 8/1988 | Sircar et al. | 55/26 |
| 4,810,265 | 3/1989 | Lagree et al. | 55/26 |
| 4,813,977 | 3/1989 | Schmidt et al. | 55/26 |
| 4,840,647 | 6/1989 | Hay | 55/26 |
| 4,857,083 | 8/1989 | DiMartino | 55/26 |
| 4,892,565 | 1/1990 | Schmidt et al. | 55/26 |

FOREIGN PATENT DOCUMENTS 0193716 9/1986 European Pat. Off. .

Primary Examiner—Robert Spitzer
Attorney, Agent, or Firm—Geoffrey L. Chase; James C. Simmons; William F. Marsh

[57] ABSTRACT

A method is described for recovering nitrogen from air in a three bed vacuum swing adsorption technique in which the beds are not rinsed with nitrogen gas before recovering a nitrogen recycle stream and a nitrogen product.

11 Claims, 2 Drawing Sheets

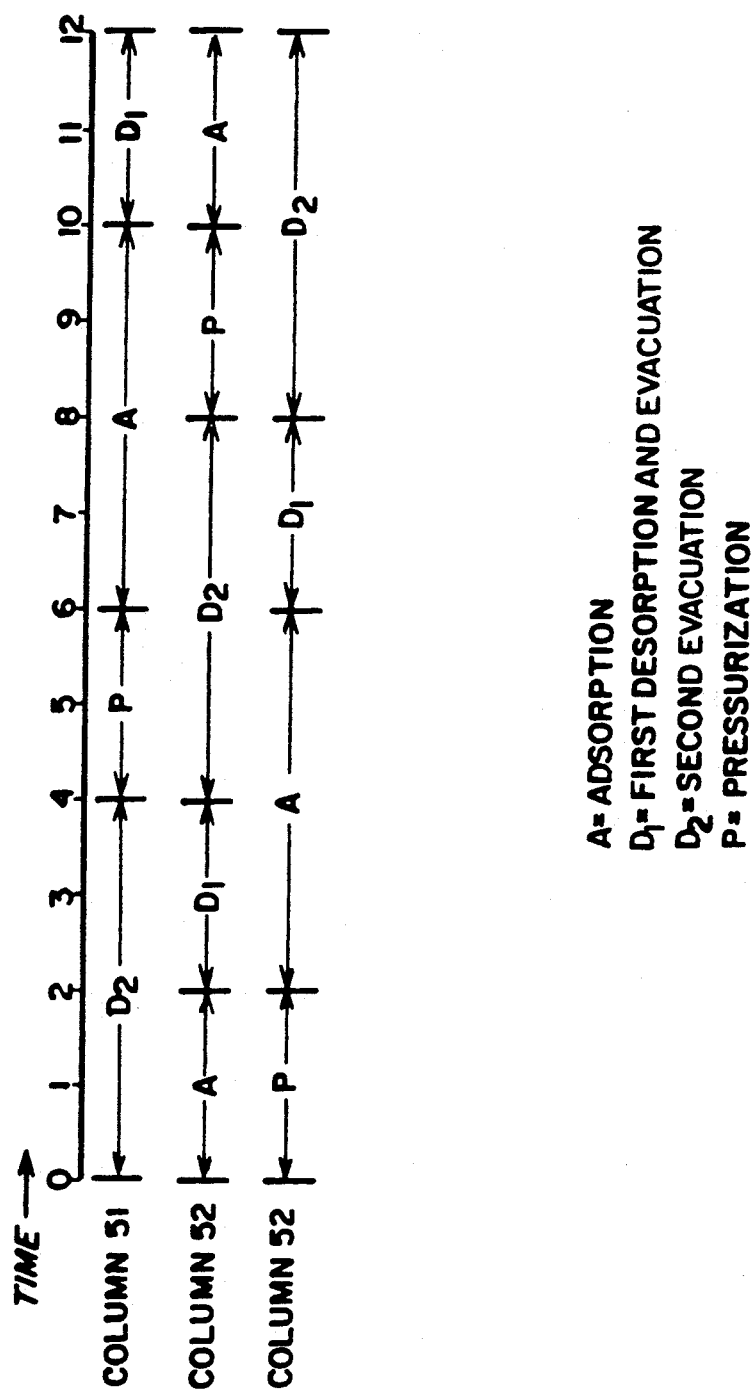

5,084,075

VACUUM SWING ADSORPTION PROCESS FOR PRODUCTION OF 95+% N₂ FROM AMBIENT AIR

TECHNICAL FIELD

The present invention is direct to air separation using pressure swing adsorption to produce moderately pure nitrogen with less capital cost and energy requirements. More specifically, the present invention is directed to vacuum swing adsorption without nitrogen rinse to produce nitrogen from air at a purity of 95%+ or better in a process that is less capital intensive and energy intensive than the prior art.

BACKGROUND OF THE PRIOR ART

Various pressure swing adsorption processes are known for separating gas mixtures. A subset of the generic pressure swing adsorption process is vacuum swing adsorption, wherein the pressure swing or pressure variation over the entire process cycle sequence includes at least some operation below ambient pressures, thus the vacuum terminology. Vacuum swing adsorption may include elevated pressures above ambient pressures in some portions of the overall cycle sequence, but must include at least some sub-ambient pressures at some portion of the cycle sequence in contrast to most pressure swing adsorption cycles, which have a lowest most pressure at ambient or above ambient pressure conditions.

In the use of pressure swing and vacuum swing adsorption techniques for the production of purified gas compositions from feed gas mixtures of bulk compositions, very high purity gas composition products are often difficult to obtain due to the tendency for co-adsorption of the components of the gas mixture and the modest selectivity of chosen adsorbent materials for one gas component over the other gas components in the total feed gas mixture. To enhance purities to commercially desirable levels, it has previously been typically believed that a purge or rinse gas step with the more selectively adsorbed component of the feed mixture in the overall pressure swing or vacuum swing adsorption cycle sequence is necessary to flush co-adsorbed components and void space gas (that gas left in the interstices between adsorbent particles and that gas in the macropores within the particles in the packed adsorption bed) prior to removing the desired gas product when the desired gas product is the more selectively adsorbed rather than the less selectively adsorbed species.

Such vacuum swing adsorption cycle sequences are capable of providing gas products of purities exceeding 99.5%. However, the use of rinse gas or purge gas particularly when it is a portion of the desired gas product results in recycle of the rinse gas to feed which in turn effects energy requirements of the overall process for the recycle, as well as enlarging the capital requirements of the process.

In U.S. Pat. No. 4,077,779 a process is described wherein hydrogen-containing gas mixtures are subjected to selective adsorption in a pressure swing cyclic system to remove carbon dioxide and/or hydrocarbon gases, obtaining high recovery of hydrogen at high purity. The system can also be employed for separation of methane from admixture with $CO_2$. Multiple stages of depressurization are set forth but are preceded by rinse steps. The product is not selectively adsorbed by the adsorption bed, and most of it passes through the bed during the adsorption step.

Published European application 0 193 716 has a process described for separating gas mixtures containing a primary gaseous component and a secondary gaseous component by selective adsorption of the secondary gaseous component in an adsorptive process including the steps of adsorption in at least one adsorbent bed, rinsing said bed with secondary component, depressurizing and evacuating said bed without additional rinsing and repressurizing said bed with primary gaseous component. The process is particularly attractive for recovering carbon dioxide and methane from landfill gas.

Exemplary prior art systems for recovery of high purity nitrogen using vacuum swing adsorption with recycled rinse gas is described in U.S. Pat. No. 4,013,429 and the improvement patent which provides a dried nitrogen product set forth in U.S. Pat. No. 4,264,340.

Both of these patents operate vacuum swing adsorption processes with two parallel trains of two beds in series. The beds in series include a first water and carbon dioxide selective bed where feed is first introduced and second a nitrogen selective bed where nitrogen is selectively adsorbed from oxygen. After the adsorption stage of the process, a portion of the product nitrogen previously obtained is passed through the beds to rinse out co-adsorbed oxygen and void space gas from the beds prior to the desorption and recovery of the nitrogen product. The rinse gas effluent from the rinsed beds may be recycled as feed gas. This rinse requirement requires additional manifolding, valving and storage vessels and in some instances may require additional compressor or blower equipment. The rinse stage additionally complicates the cycle.

U.S. Pat. No. 4,770,676 discloses a staged series of beds for $CO_2$ and $CH_4$ separation in which the first in the series of beds operate without a rinse or purge step. The beds are regenerated by depressurizing to ambient to remove one portion of the $CO_2$ and then evacuating to remove a second portion at the $CO_2$.

Currently, pressure swing and vacuum swing adsorption techniques for production of nitrogen in relatively low volumes are experiencing strong competition for reduction in complexity, reduction in capital cost and reduction in power requirements. A premium is placed on the least complex systems with the lowest initial purchase cost and the lowest operational power requirements to deliver modest quantities of nitrogen gas. A need has arisen for a pressure swing or a vacuum swing adsorption process that will meet these competitive pressures and still provide relatively high purity nitrogen, short of ultra high purity nitrogen requirements which are limited to specialized industries such as the electronics industry and which industries are best serviced by nitrogen provided from large scale cryogenic distillation operations.

The present invention meets the needs of this identified sector of the nitrogen consuming commercial marketplace with a unique combination of vacuum swing adsorption techniques for the recovery of relatively high purity nitrogen gas from air, as will be set forth below in greater detail.

BRIEF SUMMARY OF THE INVENTION

The present invention is a method for recovering nitrogen-enriched gas from air using an adsorption zone operated in a pressure swing sequence of stages comprising:
passing a feed air stream at an above ambient pressure through a first adsorption zone containing an adsorbent selective to retain nitrogen;
adsorbing said nitrogen and allowing an oxygen-enriched gas to pass through the zone essentially unadsorbed;
without any intervening nitrogen rinse step, desorbing and evacuating nitrogen-containing gas from said adsorption zone to an intermediate sub-ambient pressure level depending on desired nitrogen product purity by reduction of the pressure in said zone and either recycling the resulting nitrogen-containing gas to the feed air stream or rejecting it;
further evacuating nitrogen from said adsorption zone by further reduction of the pressure in said zone to a lower sub-ambient pressure and recovering this nitrogen as a nitrogen product that is more nitrogen-enriched than the recycled or rejected nitrogen-containing gas; and
repressurizing the adsorption zone from the further reduced sub-ambient pressure to a pressure approximately of the level of the feed air stream by introducing oxygen-enriched gas into the adsorption zone.

Preferably the method of the present invention is conducted in a continuous manner whereby the adsorption zone is sequentially operated through the various steps from adsorption through repressurization.

Preferably there are a plurality of parallel-connected adsorption zones for the performance of the method of the present invention. Optimally, there are three parallel-connected adsorption zones.

Preferably when one adsorption zone is undergoing the adsorption stage, a second adsorption zone is undergoing a portion of the further evacuation stage and then the repressurization stage, while a third adsorption zone is undergoing a first desorption stage and then a portion of the further evacuation stage.

Preferably the adsorption stage is conducted with the feed air stream and the optimally recycled nitrogen-containing gas during a first portion of the adsorption stage and with only the feed air stream during a second portion of the adsorption stage.

Preferably the first portion of the adsorption stage in one adsorption zone is conducted for a time period co-extensive with the desorption stage in another adsorption zone.

Preferably the adsorption zone contains a first layer of adsorbent selective for water and carbon dioxide and a second layer of adsorbent selective for adsorption of nitrogen over oxygen.

Preferably the adsorbent selective for water and carbon dioxide is selected from the group consisting of zeolites, alumina, silica gel, activated carbons and mixtures thereof. The adsorbent selective for nitrogen is selected from the group consisting of A-zeolite, X-zeolite, Y-zeolite, mordenite, such adsorbents with a single or binary exchange cation from Group I and II metals and mixtures thereof.

Preferably the nitrogen product of the method of the present invention is 95–99.5% nitrogen.

Preferably the adsorption stage is conducted at an elevated or above-ambient pressure of approximately 0 to 10 psig, the initial desorption stage is conducted down to an intermediate sub-ambient pressure of approximately 500 to 200 torr depending on the desired nitrogen purity and the further evacuation stage is conducted down to a lowest sub-ambient pressure in the range of 50 to 200 torr.

Preferably the present invention is a continuous method for recovering nitrogen-enriched gas from air using three parallel-connected adsorption zones operated in a vacuum swing sequence of stages comprising:
passing a feed air stream and a recycle nitrogen-containing gas at an above-ambient pressure level through a first adsorption zone containing an adsorbent selective to retain nitrogen;
adsorbing the nitrogen on the adsorbent and allowing oxygen-enriched gas to pass through the zone essentially unadsorbed;
continuing to pass only the feed air stream at above-ambient pressure through said adsorption zone to further adsorb nitrogen on the adsorbent and allow oxygen to pass essentially unadsorbed through the zone;
without any intervening nitrogen rinse step, desorbing and evacuating nitrogen-containing gas counter-currently of the feed air stream from the adsorption zone to an intermediate sub-ambient pressure level dependent on the desired nitrogen product purity by reduction of the pressure in the zone and recycling the resulting nitrogen-containing gas to the feed air stream;
further evacuating nitrogen from the adsorption zone counter-currently of the feed air stream by further reduction of the pressure in the zone to a lower sub-ambient pressure level of approximately 50 to 200 torr and recovering this nitrogen as a nitrogen product having a nitrogen purity of approximately 95 to 99.5%;
repressuring the adsorption zone from the lower sub-ambient pressure level to approximately the elevated pressure level of the feed air stream by introducing oxygen-enriched gas counter-currently of the feed air stream into the adsorption zone; and
repeatedly performing the sequence of stages on each of three beds in appropriate timed sequence.

DETAILED DESCRIPTION OF THE DRAWING

FIG. 2 is a graphical depiction of the cycle sequence of the embodiment of the present invention illustrated in FIG. 1.

DETAILED DESCRIPTION OF THE INVENTION

Figure 1:
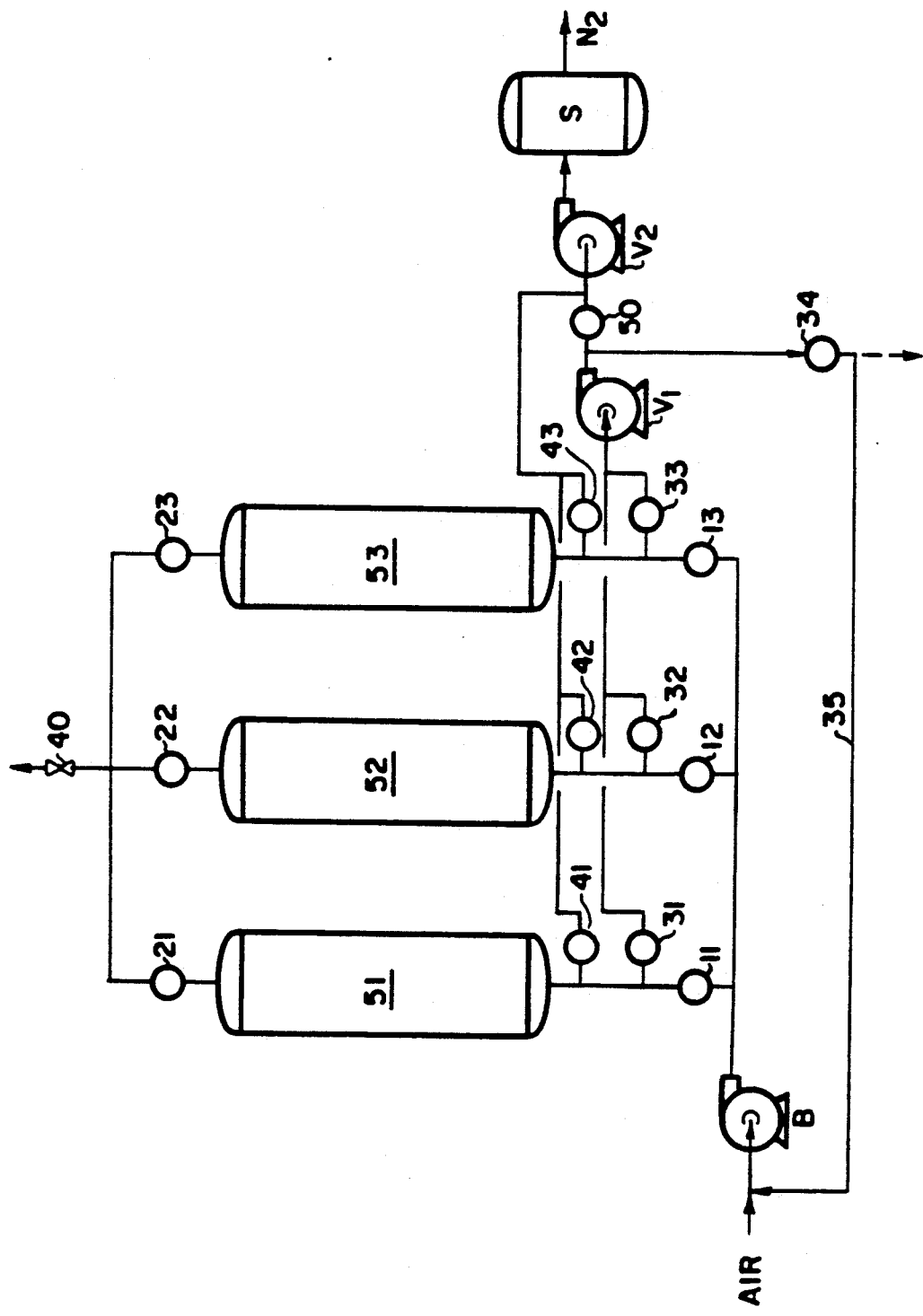
FIG. 1 is a schematic illustration of a preferred embodiment of the present invention.

The present invention is a vacuum swing adsorption process for production of 95%+ nitrogen from ambient air, by selective adsorption of of the nitrogen, on an adsorbent, such as a zeolite. The process eliminates the nitrogen rinse step of prior systems and introduces a step of fractional evacuation to produce nitrogen product. The elimination of the nitrogen rinse step from the vacuum swing adsorption process reduces the capital cost and energy requirements of the separation of air into nitrogen and oxygen. By fractionating the evacuated gas from an adsorbent in a pressure swing adsorption technique, such as the vacuum swing adsorption process of the present invention, one can get a rich product of 95% nitrogen or better. This product gas evolves at the latter part of the desorption process stage. The initial desorbed gas contains most void space gas and co-adsorbed secondary component or oxygen, and this gas can be recycled to the feed stream or rejected outside the process as a vent stream.

The present invention enjoys the benefit of the absence of a rinse step, while introducing the concept of fractionating evacuation. The process also utilizes three columns, rather than the traditional two column system of the prior art. The present invention allos for the elimination of various gas storage tanks necessary for the prior art to maintain operability in a continuous manner. The present invention also reduces the water and carbon dioxide load on the pretreatment section of the adsorption columns.

In its preferred embodiment, the present invention overcomes the problem in production of nitrogen from ambient air by selective adsorption of nitrogen by adsorbents, such as zeolites. Those prior art techniques in contrast to the present invention utilized nitrogen rinse stages following the adsorption stage in order to displace the void and co-adsorbed oxygen from the adsorption column prior to desorption of nitrogen so that the desorbed nitrogen product would be of high purity. About 50% of the desorbed nitrogen was required to be recycled as nitrogen rinse gas to effect this result. This prior art nitrogen rinse step required a nitrogen storage tank or up to four adsorbers for continuous operation. The prior art also added an extra water load on the adsorber because the nitrogen rinse gas which was recycled was wet. Furthermore, evacuating an adsorbent selective for nitrogen which is saturated with nitrogen subsequent to a nitrogen rinse step calls for a considerable amount of energy because nitrogen is by design fairly strongly adsorbed by the nitrogen selective adsorbent.

By eliminating the nitrogen rinse step of the prior art vacuum swing adsorption processes, the present invention overcomes the above-identified detriments by introducing a desorption stage where the adsorbent column is essentially saturated with air and is then evacuated to the lowest pressure level in the cycle, and the evacuated gas is fractionated to provide a gas which contains a significant amount of oxygen and a gas containing medium to high nitrogen purity. These purities are in the order of 95-99.5%+ nitrogen. This concept is based on the fact that when a nitrogen selective adsorbent saturated with air is evacuated, the oxygen concentration of the desorbed gas has an air-like composition in the beginning and then it decreases to practically zero oxygen as the adsorber pressure is lowered. By collecting the desorbed gas from the latter part of the desorption stage, one can produce a nitrogen-enriched product without implementing the nitrogen rinse step of the established prior art nitrogen recovering adsorption pressure swing air separation processes.

The present invention will be set forth in greater detail with reference to a preferred embodiment illustrated in FIG. 1 schematically and demonstrated with regard to the cycle sequence of each adsorption column with respect to the other parallel-connected columns as shown in FIG. 2. The process configuration consists of an air blower, three adsorbent columns, a vacuum train and associated switch valves and gas manifolds. The three parallel-connected adsorption columns are packed with a layer of water and carbon dioxide selective adsorbent such as zeolite, alumina, silica gel, activated carbon or their combinations in the feed air end of such columns and next a layer of nitrogen selective adsorbent such as A-zeolite, X-zeolite, Y-zeolite or mordenite with a single or binary exchange cation from groups I and II metals in the oxygen product end of the adsorbent columns. Adsorption of ambient air at near atmospheric pressure of approximately 0-10 psig by flowing air through one of the adsorption columns and producing an oxygen enriched stream of approximately 60-92% oxygen which is partially withdrawn as oxygen-enriched product and partially used to repressurized another adsorption column. The adsorption stage is stopped when the adsorption column is nearly saturated with air and the feed air is then transferred to another of the adsorption columns. Thereafter, the adsorption column that has just gone off the adsorption stage is depressurized by reducing the pressure counter-currently to the direction of feed air to an initial sub-ambient level of evacuation determined by the desired purity of the nitrogen product. The nitrogen composition of the desorbed gas starts at the composition of the feed air which is approximately 79% nitrogen and rapidly increases to 95-100% nitrogen. The initial portion (cut) of the desorbed and evacuated gas is rejected or recycled to the feed air stream to another adsorption column then undergoing the adsorption stage. The latter portion (cut) of the evacuated gas constitutes nitrogen-rich product containing an average of approximately 95-99.5% nitrogen. This nitrogen desorbed gas is recovered as nitrogen product. The relative portions of these two fractions depends on the purity of the desired nitrogen product. For a lower desired purity product (95% nitrogen), the latter cut of the evacuated gas is much larger in amount than the first cut. The latter or second cut of the evacuated gas decreases in amount as the desired nitrogen product purity increases. The product gas contains all of the water and carbon dioxide introduced by the feed gas stream in the adsorption stage if the first cut of the desorbed and evacuated gas is recycled as feed gas. The product gas is fairly dry if the first cut of the desorbed and evacuated gas is not recycled as feed. The first cut of the desorption stage is terminated when the desorbing and evacuating column pressure is at a range of approximately 200 to 400 torr. The second cut of evacuation is continued until the adsorbent column pressure reaches approximately 50-200 torr, and then the adsorption column is repressurized to near adsorption pressure by counter-currently introducing a part of the oxygen-enriched effluent then being produced by another column undergoing the adsorption stage. This process is repeated for each of the three parallel connected adsorption columns as identified in FIG. 2. The particular interrelated phases of operation for each of the beds as they undergo their various stages of adsorption, initial desorption and evacuation, further evacuation and repressurization are illustrated in FIG. 2.

With regard to FIG. 1, it can be seen that air is introduced through compressor or blower B optionally along with recycled first depressurization and evacuation gas in line 35 and is introduced through one of three valved lines, 11, 12, 13, and for this instance it will be considered that valve 11 is open while valve 12 and 13 are closed. The feed air stream now at elevated pressure after passing through the compressor B flows through open valve 11 into the first of three parallel adsorbent columns 51, 52 and 53. In this instance, adsorbent column 51 is supplied with the feed air stream and has a packing of water and carbon dioxide selective adsorbent in the initial portion of the bed and a nitrogen selective adsorbent in the latter portion of the bed. Nitrogen is adsorbed on the adsorbent in the column and oxygen is allowed to pass through the column essentially unadsorbed through open valve 21 and open valve 40. Valves 22 and 23 are closed at this time. After an initial portion of the adsorption stage, valve 34 is closed and only the feed air stream is introduced into adsorption column 51. At this time, valve 40 closes and valve 22 opens and the oxygen-enriched gas passing through adsorption column 51 is used to repressure adsorption column 52.

adsorption column 51 counter-currently from adsorption column 53 and open valve 23 wherein adsorption column 53 is now on the second portion of its adsorption stage.

Each adsorption column undergoes a similar sequence of operation as is described for adsorption column 51 as can be further detailed from the cycle sequence of FIG. 2 and the valve chart of Table 1 below.

TABLE 1

| | Valve Sequence for FIG. 2 | | | | | | | | | | | | | |
|---|---|---|---|---|---|---|---|---|---|---|---|---|---|---|
| TIME | 11 | 12 | 13 | 21 | 22 | 23 | 31 | 32 | 33 | 41 | 42 | 43 | 34 | 40 | 50 |
| 0-1 |  | 0 |  |  | 0 | 0 | 0 |  |  |  |  |  |  |  | 0 |
| 1-2 |  | 0 |  |  | 0 | 0 | 0 |  |  |  |  |  |  |  | 0 |
| 2-3 |  |  | 0 |  |  | 0 |  | 0 |  | 0 |  |  | 0 | 0 |  |
| 3-4 |  |  | 0 |  |  | 0 |  | 0 |  | 0 |  |  | 0 | 0 |  |
| 4-5 |  |  | 0 | 0 |  | 0 |  | 0 |  |  |  |  |  |  | 0 |
| 5-6 |  |  | 0 | 0 |  | 0 |  | 0 |  |  |  |  |  |  | 0 |
| 6-7 | 0 |  |  |  | 0 |  |  |  | 0 |  | 0 |  | 0 | 0 |  |
| 7-8 | 0 |  |  |  | 0 |  |  |  | 0 |  | 0 |  | 0 | 0 |  |
| 8-9 | 0 |  |  | 0 | 0 |  |  |  | 0 |  |  |  |  |  | 0 |
| 9-10 | 0 |  |  | 0 | 0 |  |  |  | 0 |  |  |  |  |  | 0 |
| 10-11 |  | 0 |  |  | 0 |  | 0 |  |  |  |  | 0 | 0 | 0 |  |
| 11-12 |  | 0 |  |  | 0 |  | 0 |  |  |  |  | 0 | 0 | 0 |  |

0 = Open
blank = closed

At the end of the adsorption stage of adsorption column 51, valve 21 closes along with valve 11 while valve 12, valve 22 and valve 40 are open so that the feed air stream with or without the recycled nitrogen-containing gas in line 35 and open valve 34 proceed to adsorption column 52 initially and then as in the case of adsorption column 51 in the latter half of the adsorption stage of adsorption column 52 only the feed air stream is introduced through valve 12. During this time column 51 is initially desorbed and evacuated by reducing its pressure by opening valve 31 and valve 34, and subjecting adsorption column 51 to a vacuum with the first stage $V_1$ of a two stage vacuum compressor $V_1$ and $V_2$. This initial desorbing and evacuating of nitrogen-containing gas counter-currently of the feed air stream passage through adsorption column 51 is relatively air-like initially with decreasing oxygen content as desorption continues. This gas is passed through open valve 34 as the recycled nitrogen-containing gas in line 35 to the feed air stream. Alternatively, this gas can be rejected by venting the gas after valve 34 and not introducing it into the manifold 35. This will reduce the water load on the adsorbent in the adsorption column during the adsorption stage. It will also lower the water content of the nitrogen product.

After appropriate time, when the desorbing and evacuating gas is deemed to have a sufficient nitrogen purity, valve 34 is closed and valve 50 is opened and the further evacuation of adsorption column 51 to recover nitrogen product is conducted using both stages $V_1$ and $V_2$ of the vacuum pump wherein the nitrogen product is stored in the storage vessel S or directly withdrawn for use.

After an additional appropriate time, valves 31 and 50 are closed and valve 41 is opened to further evacuate the adsorption column 51 to a final pressure level of 50-200 torr using the second stage $V_2$ of the vacuum pump. This gas also forms a part of the nitrogen product and is also stored in storage vessel S or directly withdrawn for use. The mixed composition of the nitrogen product is 95 to 99.5% nitrogen.

When this point is reached, valve 41 is closed and valve 21 is opened to allow oxygen to repressurize It may be seen from FIG. 2 that the time schedules for the operations of this process are designed in such a fashion that the adsorption (A) and the second depressurization ($D_2$) stages can be carried out in a continuous manner. This allows continuous air feed and withdrawal of nitrogen product from the process.

The present invention has been set forth with regard to a single preferred embodiment showing a three bed configuration. However it is appreciated that other configurations of a nitrogen recovering vacuum swing adsorption process that avoids a nitrogen rinse step can be considered, particularly a four bed operation requiring only minor alternation of the cycle sequence. This embodiment can be used to eliminate the air blower or compressor from the process and use one stage of the vacuum or air blower in one part of the cycle while using that stage of the vacuum pump to evacuate the adsorption column in another point in the cycle.

Such embodiments of the present invention enjoy advantages over the known prior art including the absence of the nitrogen rinse step, the utilization of a fractionated evacuation step after the adsorption stage, lower power cost for nitrogen separation from a gas mixture, lower capital cost for the attendant equipment to operate the process, use of three parallel connected beds for continuous operation, smaller water retention adsorbent layer in light of the absence of wet nitrogen recycle and a reduction of the drying load if a dry nitrogen product is desired. Omission of a rinse step has been practiced in $CO_2/CH_4$ separations where high differential selectivity on the adsorbent would make such separations readily feasible, but the separation of nitrogen from oxygen without a rinse step is suprising given the moderate differential selectivity of nitrogen over oxygen on available adsorbents. In addition, the concept of fractional evacuation for determining the precise purity of the nitrogen product is a unique advantage of the present invention in light of the moderate differential selectivity.

The present invention has been set forth as described above; however, the full scope of the invention should be ascertained from the claims which follow.

I claim:

1. A method for recovering nitrogen-enriched gas from air using an adsorption zone operated in a pressure swing sequence of stages comprising:
    (a) passing a feed air stream at an above-ambient pressure of approximately 0-10 psig through a first adsorption zone containing an adsorbent selective to retain nitrogen, adsorbing said nitrogen and allowing oxygen-enriched gas to pass through the zone essentially unadsorbed;
    (b) without any intervening nitrogen rinse step, counter-currently desorbing and evacuating nitrogen-containing gas from said adsorption zone to an intermediate, sub-ambient pressure level of approximately 500 to 200 torr depending on desired nitrogen product purity by reduction of the pressure in said zone and either recycling the resulting nitrogen-containing gas to the feed air stream of step (a) or rejecting it;
    (c) further evacuating nitrogen from said adsorption zone by further reduction of the pressure in said zone to a lower sub-ambient pressure in the range of 50 to 200 torr and recovering this nitrogen as a nitrogen product that is more nitrogen enriched than the nitrogen-containing gas of step (b) and said nitrogen product having a nitrogen purity of approximately 95 to 99.5%; and
    (d) repressuring the adsorption zone from the further reduced, sub-ambient pressure of step (c) to a pressure approximately of the level of the feed air stream of step (a) by introducing oxygen-enriched gas of step (a) into the adsorption zone.

2. The method of claim 1 wherein the method is conducted in a continuous manner whereby the repressurized adsorption zone of step (d) is sequentially operated using steps (a) through (d).

3. The method of claim 1 wherein there are a plurality of parallel-connected adsorption zones.

4. The method of claim 1 wherein there are three parallel-connected adsorption zones.

5. The method of claim 1 wherein when one adsorption zone is undergoing the adsorption stage, step (a); a second adsorption zone is undergoing a portion of the further evacuation stage, step (c) and then the repressurization stage, step (d); while a third adsorption zone is undergoing the first desorption and evacuation stage, step (b) and then a portion of the further evacuation stage, step (c).

6. The method of claim 1 wherein the adsorption stage of step (a) is conducted with said feed air stream and the recycled nitrogen containing gas of step (b) during a first portion of the adsorption stage of step (a) and with only said feed air stream during a second portion of the adsorption stage of step (a).

7. The method of claim 1 wherein said first portion of the adsorption stage is conducted for a time period co-extensive with the desorption and evacuation stage of step (b).

8. The method of claim 1 wherein the adsorption zone contains a first layer of adsorbent selective for water and carbon dioxide and a second layer of adsorbent selective for nitrogen.

9. The method of claim 8 wherein adsorbent selective for water and carbon dioxide is selected from the group consisting of zeolites, alumina, silica gel, activated carbon and mixtures thereof.

10. The method of claim 8 wherein the adsorbent selective for nitrogen is selected from the group consisting of A-zeolite, X-zeolite, Y-zeolite, mordenite, such adsorbents with a single or binary exchanged cation from Group I and II metals, and mixtures thereof.

11. The continuous method for recovering nitrogen-enriched gas from air using three parallel-connected adsorption zones operated in a vacuum swing sequence of stages comprising:
    (a) passing a feed air stream and optimally a recycle nitrogen-containing gas of step (c) at an above-ambient pressure level of approximately 0-10 psig through a first adsorption zone containing an adsorbent selective to retain nitrogen, adsorbing said nitrogen on said adsorbent and allowing oxygen-enriched gas to pass through the zone essentially unadsorbed;
    (b) continuing to pass only the feed air stream at elevated pressure through said adsorption zone to further adsorb nitrogen on said adsorbent and allow oxygen to pass essentially unadsorbed through the zone;
    (c) without any intervening rinse step, desorbing and evacuating nitrogen-containing gas counter-currently of the feed air stream of steps (a) and (b) from said adsorption zone to an intermediate sub-ambient pressure level dependent on the desired nitrogen product purity by a reduction of the pressure in said zone and recycling the resulting nitrogen-containing gas to the feed air stream of step (a);
    (d) further evacuating nitrogen from said adsorption zone counter-currently of the feed air stream of steps (a) and (b) by further reduction of the pressure in said zone to a lower sub-ambient pressure level of approximately 50 to 200 torr and recovering this nitrogen as a nitrogen product having a nitrogen purity of approximately 95 to 99.5%;
    (e) repressuring the adsorption zone from the lower sub-ambient pressure level of step (d) to approximately the elevated pressure level of the feed air stream of step (a) by introducing oxygen-enriched gas of step (b) counter-currently of the feed air stream of steps (a) and (b) into the adsorption zone; and
    (f) repeatedly performing the sequence of steps (a) through (e) on each of the three beds in appropriate timed sequence.

* * * * *

UNITED STATES PATENT AND TRADEMARK OFFICE
CERTIFICATE OF CORRECTION

PATENT NO. : 5,084,075
DATED : January 28, 1992
INVENTOR(S) : Shivaji Sircar It is certified that error appears in the above-identified patent and that said Letters Patent is hereby corrected as shown below:

Column 9, line 21,

After the word "further" insert the word --counter-currently--.

Signed and Sealed this

Twenty-sixth Day of January, 1993

*Attest:*

STEPHEN G. KUNIN

*Attesting Officer*   *Acting Commissioner of Patents and Trademarks*